(12) United States Patent
Roger et al.

(10) Patent No.: US 12,209,602 B2
(45) Date of Patent: Jan. 28, 2025

(54) METHOD FOR FILLING A HYDRAULIC CIRCUIT OF AN ELECTRO-HYDROSTATIC SYSTEM USING A FILLING DEVICE

(71) Applicant: SAFRAN LANDING SYSTEMS, Velizy Villacoublay (FR)

(72) Inventors: Jean-Charles Roger, Moissy-Cramayel (FR); Jean-Baptiste Kamis, Moissy-Cramayel (FR); Thomas Prado, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 82 days.

(21) Appl. No.: 18/014,008

(22) PCT Filed: Jun. 30, 2021

(86) PCT No.: PCT/EP2021/068040
§ 371 (c)(1),
(2) Date: Dec. 30, 2022

(87) PCT Pub. No.: WO2022/003043
PCT Pub. Date: Jan. 6, 2022

(65) Prior Publication Data
US 2023/0296118 A1    Sep. 21, 2023

(30) Foreign Application Priority Data

Jul. 2, 2020    (FR) ...................................... 2007034

(51) Int. Cl.
*F15B 21/00*    (2006.01)
*F15B 1/26*    (2006.01)
(Continued)

(52) U.S. Cl.
CPC ............. *F15B 21/005* (2013.01); *F15B 1/265* (2013.01); *B64F 5/40* (2017.01); *F15B 21/044* (2013.01);
(Continued)

(58) Field of Classification Search
CPC .................... F15B 21/005; F15B 1/265; F15B 2211/20515; F15B 2211/20561;
(Continued)

(56) References Cited

U.S. PATENT DOCUMENTS 3,538,682 A * 11/1970 Chattin ................. F15B 21/005
                                                               96/193
5,060,703 A * 10/1991 Koerner ................ B60T 17/222
                                                               141/59
(Continued)

FOREIGN PATENT DOCUMENTS

DE    254 814 A1    5/1974
EP    1 820 975 A2    8/2007
(Continued)

OTHER PUBLICATIONS

FR-2836671-A1 English Translation of Specification (Year: 2024).*
International Search Report for PCT/EP2021/068040 dated Oct. 8, 2021.

*Primary Examiner* — Kenneth Rinehart
*Assistant Examiner* — Stephanie A Shrieves
(74) *Attorney, Agent, or Firm* — Sughrue Mion, PLLC

(57) ABSTRACT

A method for filling a hydraulic circuit of an electro-hydrostatic system includes connecting first and third shut-off valves to a discharge valve, and connecting a second shut-off valve to a filling valve, while the second and third shut-off valves are closed, opening the filling valve, the discharge valve and the first shut-off valve and operating a vacuum generator, once a vacuum has been established in the hydraulic circuit, opening the second shut-off valve in (Continued)

order to fill the hydraulic circuit with pressurized hydraulic fluid while the vacuum generator is still in operation, once the hydraulic circuit has been filled with fluid, closing the first shut-off valve and then opening the third shut-off valve in order to bypass the vacuum generator and circulate the fluid through the electro-hydrostatic system until the fluid contained in the hydraulic circuit reaches a predetermined pressure, and closing the discharge valve and the filling valve.

6 Claims, 1 Drawing Sheet

(51) Int. Cl.
  *B64F 5/40* (2017.01)
  *F15B 21/044* (2019.01)
(52) U.S. Cl.
  CPC . *F15B 2211/20515* (2013.01); *F15B 2211/89* (2013.01)
(58) Field of Classification Search
  CPC ........ F15B 2211/20576; F15B 2211/27; F15B 2211/30585; F15B 2211/3059; F15B 2211/31541; F15B 2211/327; F15B 2211/613; F15B 2211/615; F15B 2211/625; F15B 2211/7053; F15B 2211/785; F15B 2211/8609; F15B 2211/89; F15B 7/006; F15B 21/044; F15B 7/003; B64C 13/504; B64C 25/22; B64F 5/40; B60T 17/222
  USPC ...................................................... 141/1, 65
  See application file for complete search history.

(56) References Cited

U.S. PATENT DOCUMENTS

| | | | | |
|---|---|---|---|---|
| 7,281,551 | B2* | 10/2007 | Mengelt | B60T 17/222 |
| | | | | 141/59 |
| 8,091,693 | B2* | 1/2012 | Della Valle | F15B 21/005 |
| | | | | 188/352 |
| 8,151,818 | B2* | 4/2012 | Wiens | F15B 1/26 |
| | | | | 137/590 |
| 10,232,958 | B2* | 3/2019 | Pountney | B64D 45/0005 |
| 10,358,236 | B2* | 7/2019 | Pountney | B64F 5/60 |
| 2020/0240445 | A1* | 7/2020 | Schober | F15B 11/036 |

FOREIGN PATENT DOCUMENTS

| | | | | |
|---|---|---|---|---|
| FR | 2836671 A1 * | 9/2003 | | B62D 5/30 |
| WO | 2009/000253 A2 | 12/2008 | | |
| WO | 2019/072715 A1 | 4/2019 | | |

* cited by examiner

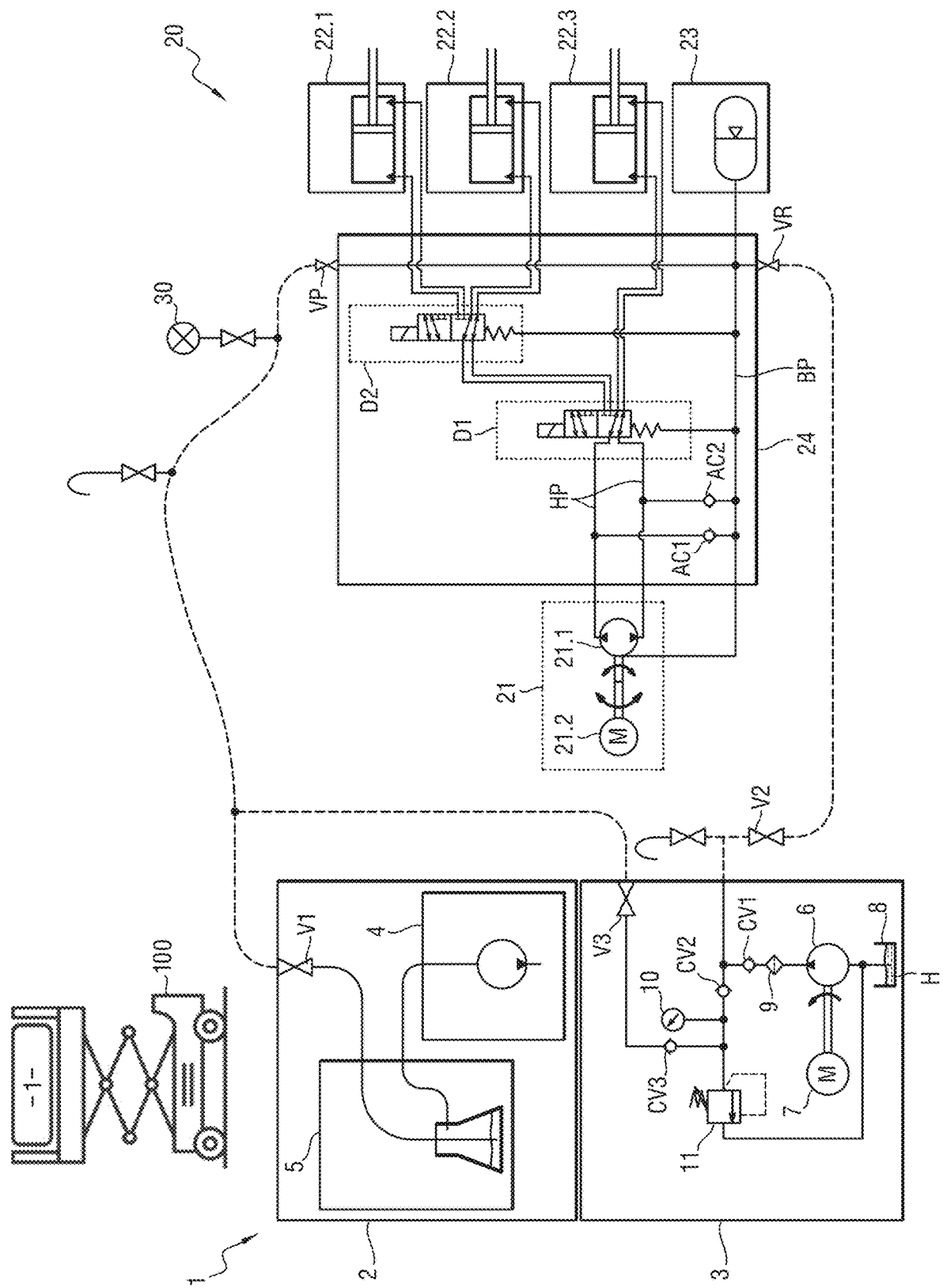

METHOD FOR FILLING A HYDRAULIC CIRCUIT OF AN ELECTRO-HYDROSTATIC SYSTEM USING A FILLING DEVICE

CROSS REFERENCE TO RELATED APPLICATIONS

This Application is a National Stage of International Application No. PCT/EP2021/068040 filed Jun. 30, 2021, claiming priority based on French Patent Application No. 2007034 filed Jul. 2, 2020, the contents of each of which being herein incorporated by reference in their entireties.

The invention relates to the field of electro-hydrostatic systems (also called electro-hydraulics), and more particularly to a device for filling a hydraulic circuit of an electro-hydrostatic system, as well as a filling method using such a device.

BACKGROUND OF THE INVENTION

It is known to equip an aircraft with electro-hydrostatic systems (EHA-Electro Hydrostatic Actuator [s]) for locally generating hydraulic energy intended to actuate mobile parts of the aircraft, such as the ailerons, the rudder or the landing gear. Such a system is, for example, known from document FR-A-2836671. EHA systems make it possible to dispense with the presence of a hydraulic network covering the entire aircraft, and thus to improve the reliability of the aircraft while significantly reducing its weight.

An EHA system conventionally comprises a hydraulic actuator such as a cylinder, a hydraulic pump driven by an electric motor, and a hydraulic circuit connecting the pump to the cylinder. The hydraulic pump pressurizes a working fluid contained in the circuit (generally, hydraulic oil) to increase the pressure in a chamber of the cylinder and operate it. The EHA system thus forms an independent hydraulic unit containing its own reserve of fluid, which facilitates maintenance.

Nevertheless, a hydraulic pump is sensitive to cavitation. It is therefore necessary, when filling the circuit of the EHA system, to evacuate as much as possible the air present in said circuit, otherwise, the pump will be seriously damaged. To do this, it is common practice to actuate the cylinder "manually" several times while the circuit is being filled. However, such actuations may be difficult and complex to perform, especially in the case of an EHA system dedicated to raising a landing gear. Moreover, their effectiveness turns out to be limited, air generally remaining trapped in cavities of the circuit and/or of the cylinder.

In addition, when the hydraulic pump is a booster pump, the EHA system circuit must be filled to a predetermined pressure in order to ensure that the pump is operating properly.

OBJECT OF THE INVENTION

The invention therefore aims to propose a device for reliably and efficiently filling a circuit of an electro-hydrostatic system without a heavy maintenance operation.

SUMMARY OF THE INVENTION

To this end, there is provided a device for filling a hydraulic circuit of an electro-hydrostatic system provided with a discharge valve and a filling valve. According to the invention, the filling device comprises:

- a vacuum generator designed to be connected to the discharge valve via a first shut-off valve in order to eliminate the air or gases present in the circuit, and
- a source for supplying pressurized hydraulic fluid, which is designed to be connected to the filling valve via a second shut-off valve and to the discharge valve and the first shut-off valve via a third shut-off valve in order to fill the hydraulic fluid circuit.

The vacuum generator is used to establish the vacuum in the hydraulic circuit of the electro-hydrostatic system and thus efficiently evacuate the air or gases contained in said circuit before filling it by means of the hydraulic fluid supply source. Thus, it is not necessary to manually actuate the electro-hydrostatic system in order to protect it from cavitation. This facilitates the maintenance and replacement of an electro-hydrostatic system.

According to a particular characteristic of the invention, the vacuum generator comprises a vacuum pump connected to the first shut-off valve by a liquid/gas separator.

According to another particular characteristic of the invention, the hydraulic fluid supply source comprises a filling pump connected to a reservoir with a capacity greater than that of the hydraulic circuit of the electro-hydrostatic system.

According to a particular embodiment of the invention, the vacuum generator and the hydraulic fluid supply source are mounted on a mobile carriage.

Particularly, the carriage is a forklift.

The invention also relates to a filling method of a circuit of an electro-hydrostatic system, using such a device.

According to the invention, the method comprises the following steps:

- connect the first and third shut-off valves to the discharge valve, and connect the second shut-off valve to the filling valve;
- while the second and third shut-off valves are closed, open the filling valve, the discharge valve and the first shut-off valve and operate the vacuum generator;
- once the vacuum has been established in the circuit, open the second shut-off valve in order to fill the circuit with pressurized hydraulic fluid while the vacuum generator is still in operation;
- once the circuit has been filled with fluid, close the first shut-off valve and then open the third shut-off valve in order to bypass the vacuum generator and circulate the fluid through the electro-hydrostatic system until the fluid contained in the circuit reaches a predetermined pressure;
- close the discharge valve and the filling valve.

Particularly, the electro-hydrostatic system comprises a plurality of actuators selectable by at least two distributors and the method comprises the step of successively controlling the distributors one after another in order to establish the vacuum in the hydraulic circuit, and the step of controlling the distributors according to a predetermined sequence in order to fill the hydraulic circuit.

BRIEF DESCRIPTION OF THE DRAWING

The invention can be better understood in the light of the following description, which is purely illustrative and non-limiting, and should be read with reference to the sole accompanying FIGURE, in which:

FIG. 1 is a diagrammatic view of a filling device according to a particular embodiment of the invention, connected to a hydraulic circuit of an electro-hydrostatic system.

DETAILED DESCRIPTION OF THE INVENTION

With reference to FIG. 1, the invention is described below in application to the filling of a hydraulic circuit of an electro-hydrostatic system 20 intended to actuate mobile parts of an aircraft.

The electro-hydrostatic system 20 comprises a motor-pump unit 21, three hydraulic cylinders 22.1, 22.2, 22.3, a hydraulic accumulator 23 and a hydraulic fluid distribution circuit 24 connecting the motor-pump unit 21 to the cylinders 22.1, 22.2, 22.3 and to the accumulator 23.

The motor-pump unit 21 comprises a hydraulic pump 21.1 driven by an electric motor 21.2. The pump 21.1 is a rotary pump with two flow directions which is configured to suck the hydraulic fluid through one orifice and discharge it through another orifice. The motor 21.2 is a three-phase motor configured to receive electrical energy supplied by an electrical power supply and to be controlled by a controller (not shown).

In conventional manner, each cylinder 22.1, 22.2, 22.3 comprises a cylinder defining a volume separated into two chambers which are isolated from each other by a piston. Two orifices make it possible to insert or evacuate a fluid into one or the other of the two chambers by means of a pressure difference induced by the pump 21.1 and therefore to move the piston. A rod is fixed to the piston and transmits a force intended to actuate one of the mobile parts of the aircraft.

The distribution circuit 24 comprises a high-pressure circuit HP connecting the pump 21.1 to the cylinders 22.1, 22.2, 22.3 to supply said cylinders with pressurized fluid. The high-pressure circuit HP comprises two monostable distributors D1, D2, making it possible to move the piston of the cylinders 22.1, 22.2, 22.3 selectively.

The distributor D1 has two first ports connected to the orifices of the pump 21.1 and four second ports, two of which are connected to the chambers of the cylinder 22.1 and two others to two first ports of the distributor D2. The distributor D2 has four second ports, two of which are connected to the chambers of the cylinder 22.2 and two others to the chambers of the cylinder 22.3.

In conventional manner, the distributor D1 comprises a slide valve that is capable of adopting two states: a rest state (illustrated in FIG. 1) in which the slide valve provides a connection between the pump 21.1 and the cylinder 22.1, and a bypass state in which the slide valve provides a connection between the pump 21.1 and the distributor D2.

The state of the distributor D1 is controlled by an electromagnet arranged at one end of said valve D1, such that a voltage generated by a control unit moves the slide valve to enable the distributor D1 to pass from the rest state to the bypass state.

In conventional manner, the distributor D2 comprises a slide valve that is capable of adopting two states: a rest state (illustrated in FIG. 1) in which the slide valve provides a connection between the distributor D1 and the cylinder 22.2 and a bypass state in which the slide valve provides a connection between the distributor D1 and the cylinder 22.3.

The state of the distributor D2 is controlled by an electromagnet arranged at one end of said valve D2, such that a voltage generated by the control unit moves the slide valve to enable the distributor D2 to pass from the rest state to the bypass state.

The distribution circuit 24 also comprises a low-pressure circuit BP connecting the accumulator 23 to the pump 21.1 in order to guarantee a reserve of pressurized hydraulic fluid in said distribution circuit 24 in order to compensate for the asymmetry of the chambers of the cylinders 22.1, 22.2, 22.3, to ensure that the pump 21.1 is boosted and to compensate for the thermal expansions of the distribution circuit 24. The low-pressure circuit BP has a filling valve VR at the bottom and a discharge valve VP at the top. Two check valves AC1, AC2 connect the low-pressure circuit BP to the high-pressure circuit HP in order to allow a balancing of the flows in order to guarantee that the pump 21.1 is boosted and the chambers 22.1, 22.2, 22.3 are resupplied.

The filling device according to the invention, generally referenced in 1, comprises a vacuum generator 2 and a pressurized hydraulic fluid supply source 3.

The vacuum generator 2 comprises a vacuum pump 4 connected to a first shut-off valve V1 by a liquid/gas separator 5. The vacuum pump 4 supplies a minimum pressure of 10 millibars (mbar) to the suction operation.

The vacuum generator 2 is connected by the first shut-off valve V1 to the discharge valve VP of the electro-hydrostatic system 20.

The hydraulic fluid supply source 3 comprises a filling pump 6 powered by an electric motor 7. The filling pump 6 has an inlet orifice connected to a reservoir 8 of hydraulic fluid H complying with the AS4059 standard to allow its cycling and to a third shut-off valve V3 via a check valve CV3, and has an outlet orifice connected to a second shut-off valve V2 via a check valve CV1. The reservoir's capacity 8 is greater than the capacity of the distribution circuit 24 of the electro-hydrostatic system 20. The filling pump 6 supplies a pressure greater than or equal to a predetermined pressure of the distribution circuit 24 at rest.

A filter 9 is arranged between the outlet orifice of the filling pump 6 and an inlet orifice of the check valve CV1 in order to avoid polluting the hydraulic fluid H injected into the distribution circuit 24 of the electro-hydrostatic system 20. A manometer 10 and a check valve CV2 are also arranged between an outlet orifice of the check valve CV1 and an outlet orifice of the check valve CV3 in order to control the pressure and the direction of flow of the hydraulic fluid H in the hydraulic fluid supply source 3.

The hydraulic fluid supply source 3 also comprises a pressure regulator 11 arranged between the outlet orifice of the check valve CV3 and the inlet orifice of the filling pump 6 in order to enable the pressure of the hydraulic fluid H contained in the distribution circuit 24 to be adjusted manually by means of the manometer 10.

There follows a detailed description of the operation of the filler device 1.

The discharge valve VP of the electro-hydrostatic system 20 is connected to the first shut-off valve V1 of the vacuum generator 2 and to the third shut-off valve V3 of the hydraulic fluid supply source 3.

The filling valve VR of the electro-hydrostatic system 20 is connected to the second shut-off valve V2 of the hydraulic fluid supply source 3.

While the second and third shut-off valves V2, V3 are closed, the filling valve VR, the discharge valve VP and the first shut-off valve V1 are open. The vacuum generator 2 is then started up in order to produce the vacuum in the low-pressure circuit BP and in the portion of the high-pressure circuit HP with which the vacuum generator 2 communicates when the distributor D1 is in the rest state.

In order to produce a vacuum in the entire high-pressure circuit HP, the distributors D1, D2 are controlled one after the other in order to pass from the rest state to the bypass state.

In order to measure the vacuum, a manometer 30 is placed as close as possible to the discharge valve VP.

When the vacuum is established in the entire distribution circuit 24 (pressure substantially equal to 10 mbar), the distributors D1, D2 are controlled in order to pass from the bypass state to the rest state, and the second shut-off valve V2 is open. The filling pump 6 of the hydraulic fluid supply source 3 is then started up with pressure regulation set to a minimum while the vacuum generator 2 is still in operation. In this way, the low-pressure circuit BP and the portion of the high-pressure circuit HP with which the hydraulic fluid supply source communicates when the distributor D1 is in the rest state are filled with hydraulic fluid H naturally.

In order to fill the entire high-pressure circuit HP, the distributor D1 and then the distributor D2 are controlled in order to pass from the rest state to the controlled state.

In the event that the liquid/gas separator 5 is full, it may be emptied by closing the first shut-off valve V1 and opening the third shut-off valve V3. In order to determine that the distribution circuit 24 has been completely filled, the liquid/gas separator 5 has to be filled repeatedly.

When the entire distribution circuit 24 is filled with hydraulic fluid H, the first shut-off valve V1 is closed and then the third shut-off valve V3 is opened in order to bypass the vacuum generator 2 and increase the hydraulic fluid pressure H contained in the distribution circuit 24 to the pressure determined by means of the pressure regulator 11 and the manometer 10.

Once the hydraulic fluid H has reached the predetermined pressure in the entire distribution circuit 24, the discharge valve VP and the filling valve VR are closed. The process of filling the electro-hydrostatic system 20 has thus finished. Subsequently, the electro-hydrostatic system 20 can be disconnected from the filling device 1.

Approximately fifteen minutes are required to fill the electro-hydrostatic system 20. The duration depends, in particular, on the length of the distribution circuit 24, on the size of the cylinders 22.1, 22.2, 22.3, on the power of the filling pump 6, etc.

It should be noted that:
the check valves CV1 and CV3 make it possible to maintain the pressure of the hydraulic fluid H contained in the distribution circuit 24 when the filling pump 6 is not in operation; and
the check valve CV2 makes it possible to force the flow of the hydraulic fluid H towards the pressure regulator 11 and the filter 9.

Naturally, the invention is not limited to the described embodiments, but covers any variant coming within the scope of the invention as defined by the claims.

The filling device may be mounted on a mobile carriage 100 in order for it to be installed as close as possible to the electro-hydrostatic system.

The carriage 100 may advantageously be a forklift, in particular, whenever the electro-hydrostatic system is at height (rudder, aileron, etc.).

Although here, the distributors D1, D2 are monostable, they may be of a different nature (bistable, etc.)

The electro-hydrostatic system need not necessarily be provided with a distributor, which simplifies the filling method.

Although here, the filling method is manual, it may be automated by using, in particular, electronic sensors and shut-off valves connected to a control unit.

Depending on their architecture and location, the cylinders may be equipped with a discharge valve.

The number of actuators may be lower than or greater than three. The electro-hydrostatic system may, in particular, comprise only one or two cylinders.

The cylinders may be of a different nature than that illustrated (single-acting cylinder, etc.) and need not necessarily be identical.

The invention claimed is:

1. A method for filling a hydraulic circuit of an electro-hydrostatic system provided with a discharge valve and a filling valve, the method using a filling device comprising:
a vacuum generator designed to be connected to the discharge valve via a first shut-off valve in order to eliminate air or gases present in the hydraulic circuit, and
a source for supplying pressurized hydraulic fluid, the source being designed to be connected to the filling valve via a second shut-off valve and to the discharge valve and the first shut-off valve via a third shut-off valve in order to fill the hydraulic circuit,
and the method comprising:
connecting the first and third shut-off valves to the discharge valve, and connecting the second shut-off valve to the filling valve;
while the second and third shut-off valves are closed, opening the filling valve, the discharge valve and the first shut-off valve and operating the vacuum generator;
once a vacuum has been established in the hydraulic circuit, opening the second shut-off valve in order to fill the hydraulic circuit with the pressurized hydraulic fluid while the vacuum generator is still in operation;
once the hydraulic circuit has been filled with fluid, closing the first shut-off valve and then opening the third shut-off valve in order to bypass the vacuum generator and circulate the fluid through the electro-hydrostatic system until the fluid contained in the hydraulic circuit reaches a predetermined pressure; and
closing the discharge valve and the filling valve.

2. The method according to claim 1, wherein the electro-hydrostatic system comprises a plurality of actuators selectable by at least two distributors, and the method comprises successively controlling the at least two distributors one after another in order to establish the vacuum in the hydraulic circuit, and controlling the at least two distributors according to a predetermined sequence in order to fill the hydraulic circuit.

3. The method according to claim 1, wherein the vacuum generator comprises a vacuum pump connected to the first shut-off valve by a liquid/gas separator.

4. The method according to claim 1, wherein the source comprises a filling pump connected to a reservoir with a capacity greater than that of the hydraulic circuit of the electro-hydrostatic system.

5. The method according to claim 1, wherein the vacuum generator and the source are mounted on a mobile carriage.

6. The method according to claim 5, wherein the mobile carriage is a forklift.

* * * * *